(12) United States Patent
Chang

(10) Patent No.: US 8,475,047 B2
(45) Date of Patent: Jul. 2, 2013

(54) SLIDING MECHANISM

(75) Inventor: A-Ming Chang, Taipei (TW)

(73) Assignee: Primax Electronics, Ltd., Teipei (TW)

( * ) Notice: Subject to any disclaimer, the term of this patent is extended or adjusted under 35 U.S.C. 154(b) by 251 days.

(21) Appl. No.: 13/105,687

(22) Filed: May 11, 2011

(65) Prior Publication Data

US 2012/0251022 A1    Oct. 4, 2012

(30) Foreign Application Priority Data

Apr. 1, 2011    (TW) .............................. 100111562 A

(51) Int. Cl.
| | |
|---|---|
| *F16C 29/00* | (2006.01) |
| *H04M 1/00* | (2006.01) |
| *H04W 88/02* | (2009.01) |

(52) U.S. Cl.
USPC ...................... 384/10; 455/575.4; 379/433.12

(58) Field of Classification Search
USPC ................ 384/10, 26; 455/575.4; 379/433.12
See application file for complete search history.

(56) References Cited

U.S. PATENT DOCUMENTS

| | | | | |
|---|---|---|---|---|
| 7,184,806 | B2 * | 2/2007 | Bae ............................ | 455/575.4 |
| 2005/0250563 | A1 * | 11/2005 | Nan ........................... | 455/575.4 |
| 2007/0155447 | A1 * | 7/2007 | Gordecki .................... | 455/575.4 |
| 2009/0082074 | A1 * | 3/2009 | Chen .......................... | 455/575.4 |
| 2009/0149230 | A1 * | 6/2009 | Ruan .......................... | 455/575.4 |
| 2010/0234080 | A1 * | 9/2010 | Holman et al. ............ | 455/575.4 |
| 2010/0304802 | A1 * | 12/2010 | Chuang et al. ............. | 455/575.4 |
| 2011/0222799 | A1 * | 9/2011 | Wang .............................. | 384/10 |

\* cited by examiner

*Primary Examiner* — Thomas R Hannon
(74) *Attorney, Agent, or Firm* — Kirton McConkie; Evan R. Witt

(57) ABSTRACT

A sliding mechanism includes a first plate, a second plate, a fixing structure and a sliding member. The second plate includes a sliding slot and a guiding part. The fixing structure has a perforation. The sliding member includes a sliding piece and an elastic element. The fixing structure is penetrated through the sliding slot of said second plate. A first end of the sliding piece is sustained against the guiding part. A second end of the sliding piece is penetrated through the perforation. When the second plate is slid with respect to the first plate for a first predetermined distance, the elastic element generates elastic potential energy. Whereas, when the second plate is slid with respect to the first plate for a second predetermined distance, the elastic element releases the elastic potential energy to have the second plate automatically slide with respect to the first plate.

24 Claims, 9 Drawing Sheets

SLIDING MECHANISM

FIELD OF THE INVENTION

The present invention relates to a sliding mechanism, and more particularly to an automatic sliding mechanism.

BACKGROUND OF THE INVENTION

In recent years, portable electronic devices have become increasingly popular. Consequently, the sliding mechanism of the portable electronic device is designed to have diversified forms and functions. For example, a sliding mechanism for use in a portable electronic device is disclosed in Taiwanese Patent No. M390622. Please refer to FIG. 1, which is a schematic exploded view illustrating a sliding mechanism disclosed in Taiwanese Patent No. M390622. As shown in FIG. 1, the sliding mechanism 10 comprises a main plate 20, two elastic elements 30 and a sliding plate 40. The main plate 20 comprises a main plate body 21, two guiding grooves 22, two liners 23 and a guider 24. The sliding plate 40 comprises a sliding plate body 41, two guiding rails 42, two sliding slots 43 and two positioning holes 44.

Please refer to FIG. 1 again. The guiding grooves 22 of the main plate 20 are arranged at bilateral sides of the main plate 20. The guiding grooves 22 are U-shaped structures that are bent from two opposite edges of the main plate 20. The guiding grooves 22 are configured to accommodate the liners 23 and the guiding rails 42 of the sliding plate 40. In such way, the sliding plate 40 is stably slid with respect to the main plate 20 and difficultly detached from the main plate 20. The elastic elements 30 are disposed within the sliding slots 43 of the sliding plate 40. An end of each elastic element 30 is fixed in a corresponding positioning hole 44. The other end of each elastic element 30 is sustained against a corresponding guiding part 242 of the guider 24.

Please refer to FIG. 2. FIG. 2 is a schematic top view illustrating the operations of the sliding mechanism disclosed in Taiwanese Patent No. M390622. When the sliding plate body 41 is slid with respect to the main plate body 21 for a predetermined distance, the resisting action of the elastic elements 30 on the guiding part 242 may cause the elastic elements 30 to accumulate the maximum elastic potential energy. When the sliding plate body 41 is slid with respect to the main plate body 21 for a distance over the predetermined distance, the resisting action of the elastic elements 30 on the guiding part 242 will be weakened because of the shape change of the guider 24. Consequently, the elastic elements 30 release the accumulated elastic potential energy. Under this circumstance, the purpose of automatically sliding the sliding plate body 41 with respect to the main plate body 21 is achieved.

The conventional sliding mechanism 10, however, still has some drawbacks. For example, since the guiding grooves 22 and the guiding rails 42 are designed to confine the sliding trajectory of the main plate 20 and the sliding plate 40, the configurations of the main plate 20 and the sliding plate 40 are complicated. In addition, since it is necessary to install the liners 23 within the guiding grooves 22 to allow for smooth sliding action of the main plate 20 and the sliding plate 40, the assembling cost of the sliding mechanism 10 is largely increased.

SUMMARY OF THE INVENTION

The present invention relates to a sliding mechanism with a simplified structure and cost-effectiveness.

In accordance with an aspect of the present invention, there is provided a sliding mechanism. The sliding mechanism includes a first plate, a second plate, a fixing structure and a sliding member. The second plate is disposed over the first plate, and includes a sliding slot and a guiding part. The fixing structure has a perforation. The fixing structure is penetrated through the sliding slot of the second plate. The sliding member is disposed over the second plate, and includes a sliding piece and an elastic element. The sliding piece has a recess for accommodating the elastic element. A first end of the sliding piece is sustained against the guiding part of the second plate. A second end of the sliding piece is penetrated through the perforation of the fixing structure. When the second plate is slid with respect to the first plate for a first predetermined distance, the sliding piece is guided by the guiding part to be slid in a first direction of the fixing structure, so that the elastic element generates elastic potential energy. Whereas, when the second plate is slid with respect to the first plate for a second predetermined distance, the sliding piece is guided by the guiding part to be slid in a second direction of the fixing structure, so that the elastic element releases the elastic potential energy to have the second plate automatically slide with respect to the first plate.

In an embodiment, the guiding slot is a linear guiding slot.

In an embodiment, the guiding part has a cambered surface.

In an embodiment, the distance between a midpoint of a camber line of the cambered surface is smaller than the distance between any end of the camber line and the sliding slot.

In an embodiment, the elastic element is a spring.

In an embodiment, a post is formed within the recess of the sliding piece for positioning the elastic element.

In an embodiment, the first predetermined distance is smaller than the second predetermined distance.

In an embodiment, the guiding part further includes at least one positioning notch.

In accordance with another aspect of the present invention, there is provided a sliding mechanism. The sliding mechanism includes a first plate, a second plate, two fixing structures and two sliding members. The second plate is disposed over the first plate, and includes two sliding slots and two guiding parts. The two fixing structures having respective perforations. The two fixing structure are respectively penetrated through the two sliding slots of the second plate. The two sliding members are disposed over the second plate. Each of the two sliding members includes a sliding piece and an elastic element. The sliding piece has a recess for accommodating the elastic element. A first end of the sliding piece is sustained against the guiding part of the second plate. A second end of the sliding piece is penetrated through the perforation of the fixing structure. When the second plate is slid with respect to the first plate for a first predetermined distance, the two sliding pieces are respectively guided by the two guiding parts to be slid in directions distant from each other, so that the two elastic elements generate elastic potential energy. Whereas, when the second plate is slid with respect to the first plate for a second predetermined distance, the two sliding pieces are respectively guided by the two guiding parts to be slid in directions facing each other, so that the two elastic elements release the elastic potential energy to have the second plate automatically slide with respect to the first plate.

In an embodiment, the two guiding slots are linear guiding slots.

In an embodiment, each of the two guiding parts has a cambered surface.

In an embodiment, the cambered surface has a camber line. The distance between a midpoint of the camber line of the cambered surface and a corresponding sliding slot is smaller than the distance between any end of the camber line and the corresponding sliding slot.

In an embodiment, the two elastic elements are springs.

In an embodiment, a post is formed within the recess of each sliding piece for positioning the corresponding elastic element.

In an embodiment, the first predetermined distance is smaller than the second predetermined distance.

In an embodiment, each of the two guiding parts further includes at least one positioning notch.

In accordance with a further aspect of the present invention, there is provided a sliding mechanism. The sliding mechanism includes a first plate, a second plate, two fixing structures and two sliding members. The second plate is disposed over the first plate, and includes two sliding slots and a guiding part. The two fixing structures have respective perforations. The two fixing structure are respectively penetrated through the two sliding slots of the second plate. The two sliding members are disposed over the second plate. Each of the two sliding members includes a sliding piece and an elastic element. The sliding piece has a recess for accommodating the elastic element. A first end of the sliding piece is sustained against the guiding part of the second plate. A second end of the sliding piece is penetrated through the perforation of the fixing structure. When the second plate is slid with respect to the first plate for a first predetermined distance, the two sliding pieces are respectively guided by the guiding part to be slid in directions distant from each other, so that the two elastic elements generate elastic potential energy. Whereas, when the second plate is slid with respect to the first plate for a second predetermined distance, the two sliding pieces are respectively guided by the guiding part to be slid in directions facing each other, so that the two elastic elements release the elastic potential energy to have the second plate automatically slide with respect to the first plate.

In an embodiment, the two guiding slots are linear guiding slots.

In an embodiment, each of the two guiding parts has a cambered surface.

In an embodiment, the cambered surface has a camber line. The distance between a midpoint of the camber line of the cambered surface and a corresponding sliding slot is smaller than the distance between any end of the camber line and the corresponding sliding slot.

In an embodiment, the two elastic elements are springs.

In an embodiment, a post is formed within the recess of each sliding piece for positioning the corresponding elastic element.

In an embodiment, the first predetermined distance is smaller than the second predetermined distance.

In an embodiment, the guiding part further comprises at least one positioning notch.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
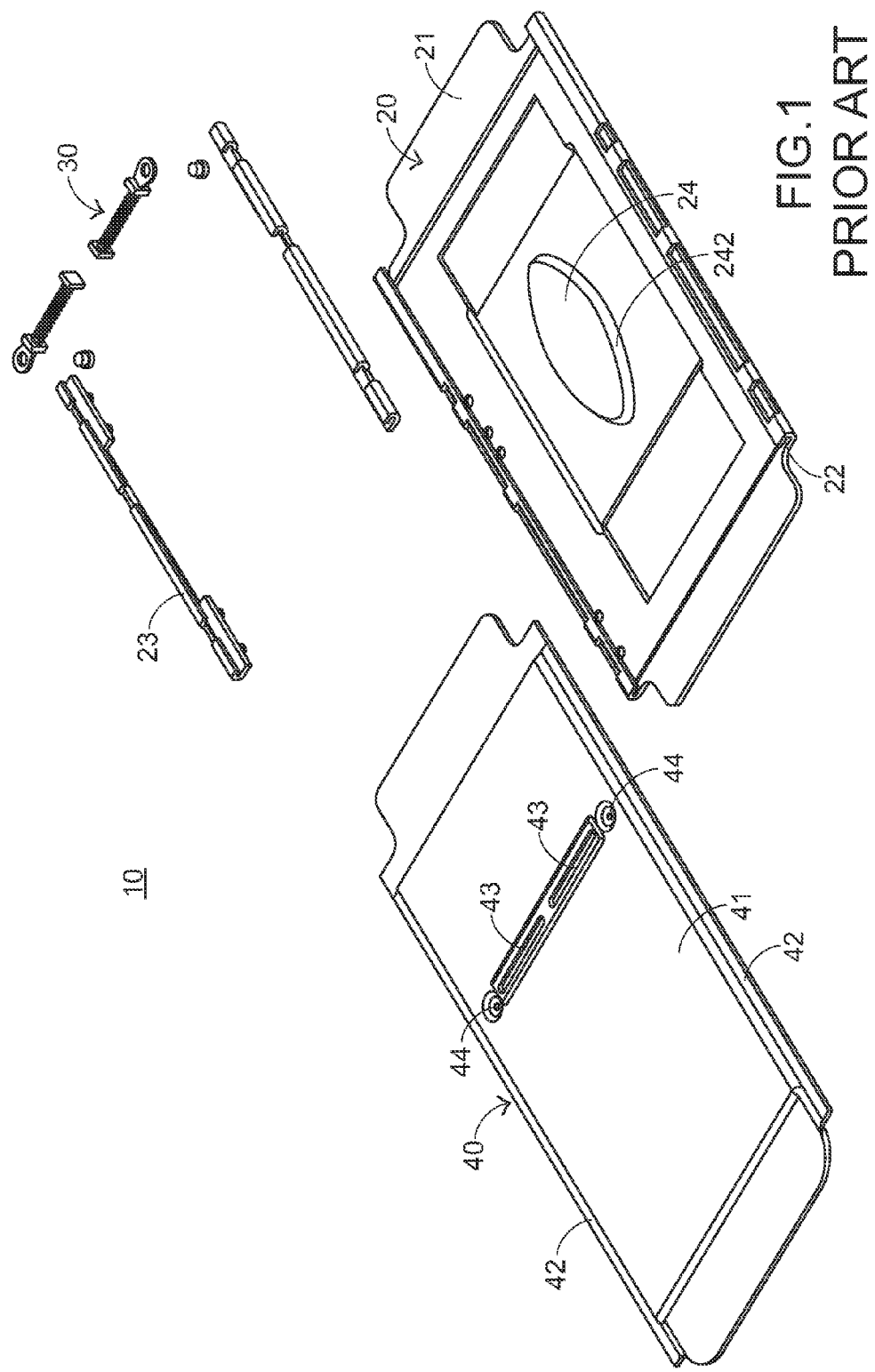
FIG. 1 is a schematic exploded view illustrating a sliding mechanism disclosed in Taiwanese Patent No. M390622.
Figure 2:
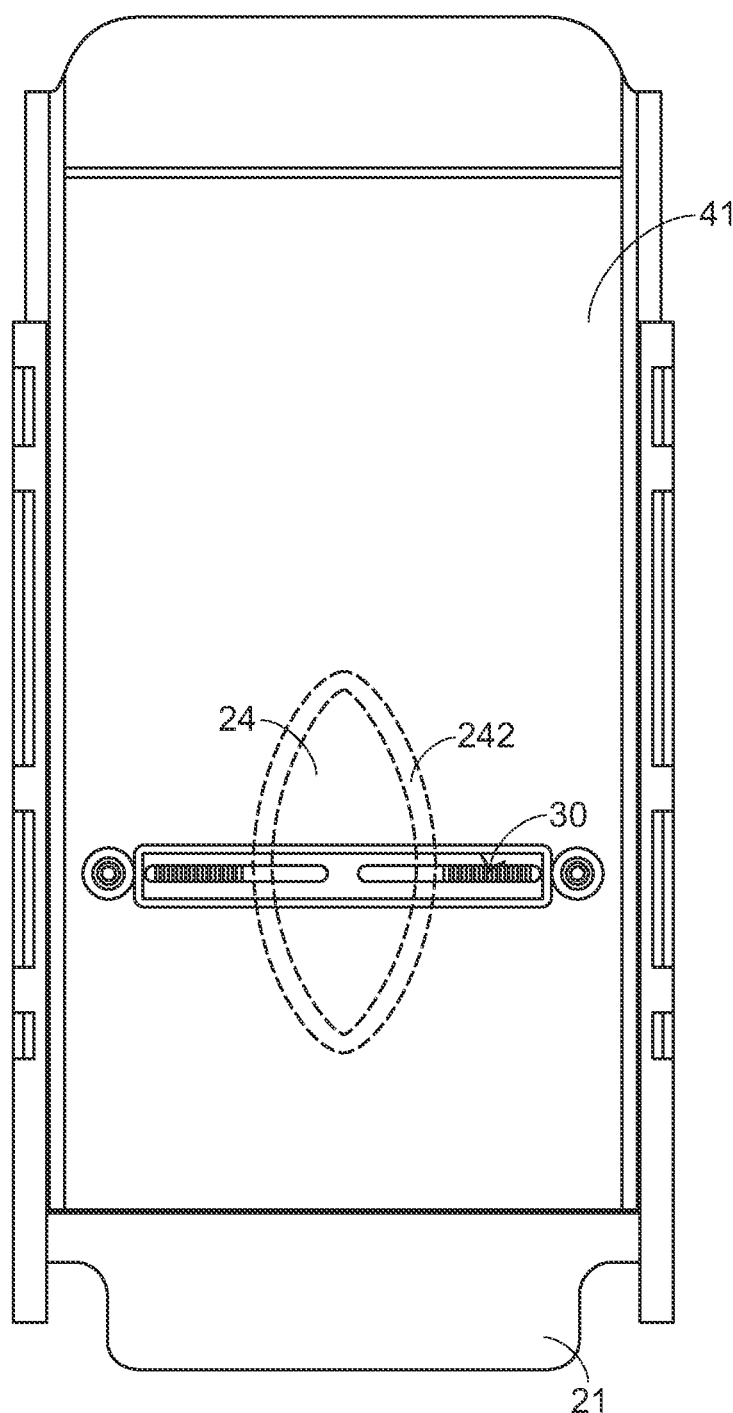
FIG. 2 is a schematic top view illustrating the operations of the sliding mechanism disclosed in Taiwanese Patent No. M390622.
Figure 3:
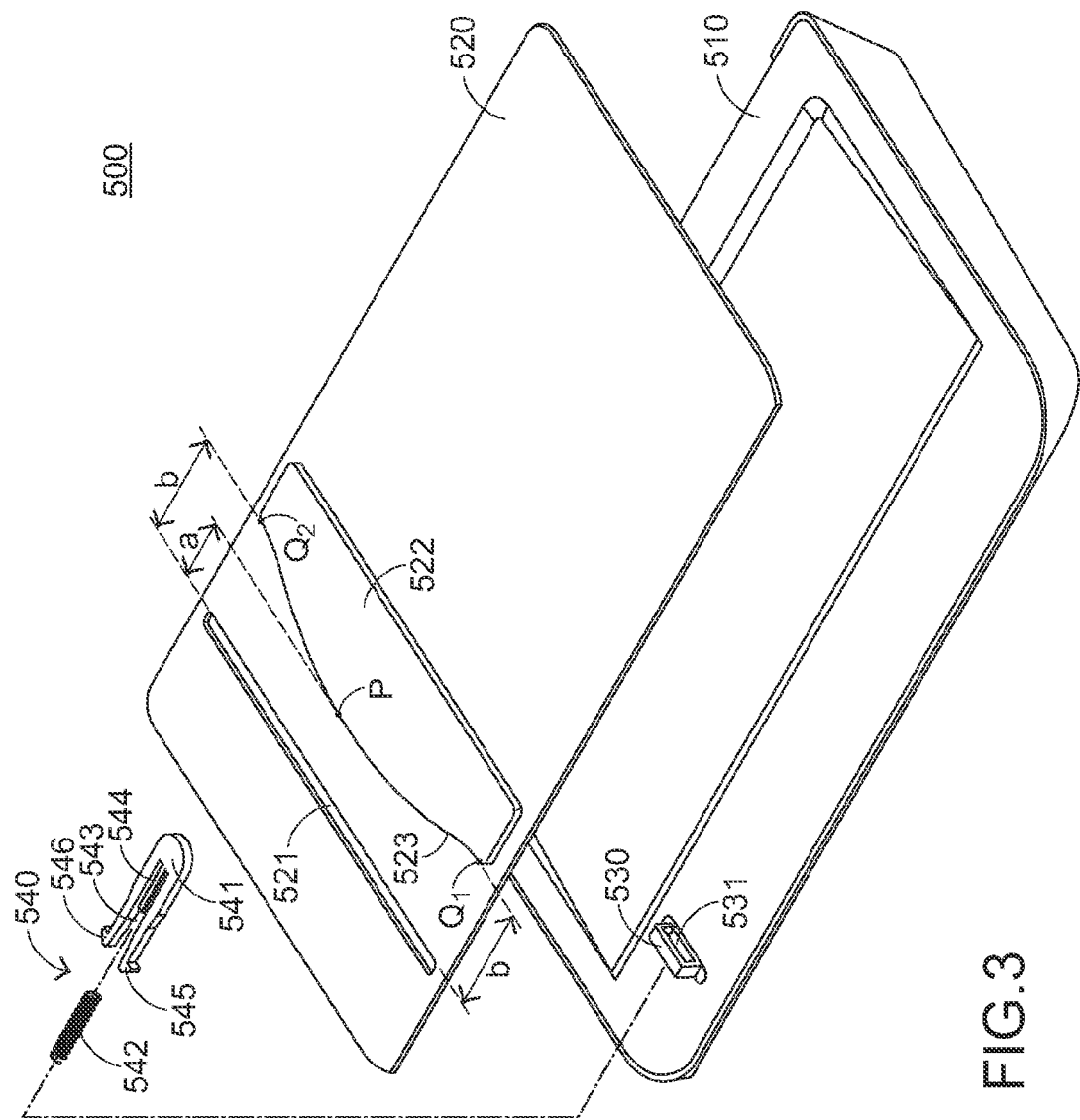
FIG. 3 is a schematic exploded view illustrating a sliding mechanism according to a first embodiment of the present invention.

Please refer to FIG. 3. FIG. 3 is a schematic exploded view illustrating a sliding mechanism according to a first embodiment of the present invention. As shown in FIG. 3, the sliding mechanism 500 of the first embodiment comprises a first plate 510, a second plate 520, a fixing structure 530 and a sliding member 540. The second plate 520 further comprises a sliding slot 521 and a guiding part 522. The fixing structure 530 further comprises a perforation 531. The sliding member 540 further comprises a sliding piece 541 and an elastic element 542.

Please refer to FIG. 3 again. The second plate 520 is in parallel with and disposed over the first plate 510. The fixing structure 530 is disposed on a top surface of the first plate 510. In addition, the fixing structure 530 is penetrated through the sliding slot 521 of the second plate 520 for positioning the second plate 520. Due to the fixing structure 530, the second plate 520 is difficulty detached from the first plate 510 when the second plate 520 is slid with respect to the first plate 510.

In this embodiment, the sliding slot 521 of the second plate 520 is a linear sliding slot, so that the fixing structure 530 can be penetrated through the sliding slot 521. The guiding part 522 of the second plate 520 has a cambered surface 523. The minimum distance "a" between the midpoint P of the camber line of the cambered surface 523 is smaller than the minimum distance "b" between the end Q1 or Q2 of the camber line and the sliding slot 521. In other words, the guiding part 522 of the second plate 520 is substantially a convex camber structure.

Moreover, the sliding piece 541 of the sliding member 540 has a recess 543 for accommodating the elastic element 542. A post 544 is formed within the recess 543. Since the elastic element 542 is sheathed around the post 544, the elastic element 542 is confined within the space between the fixing structure 530 and the recess 543 without bouncing out or shifting. In this embodiment, an example of the elastic element 542 includes but is not limited to a spring.

Figure 4:
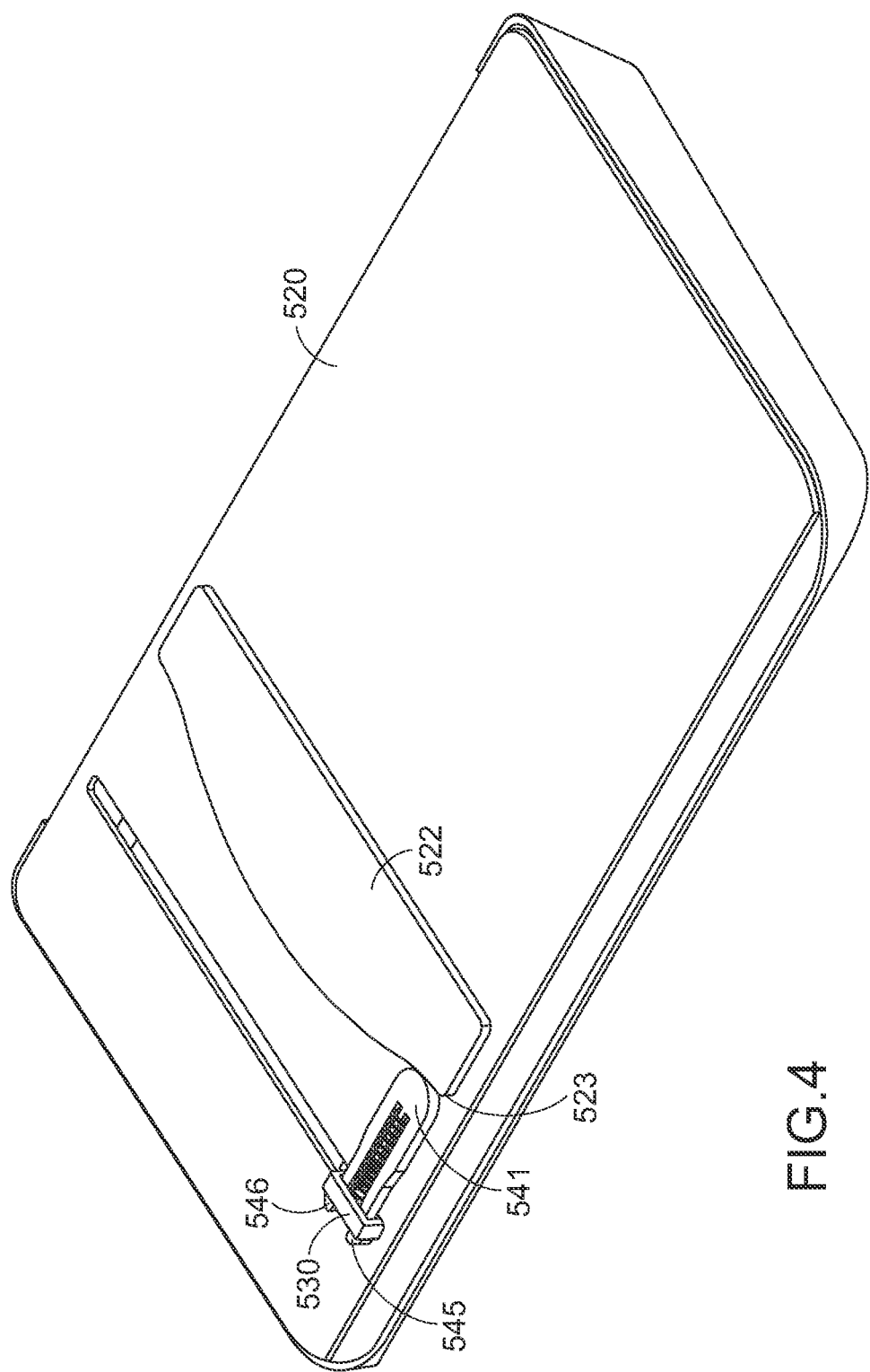
FIG. 4 is a schematic assembled view illustrating the sliding mechanism according to the first embodiment of the present invention.

Hereinafter, a process of assembling the sliding member 540 will be illustrated with reference to FIG. 4. FIG. 4 is a schematic assembled view illustrating the sliding mechanism according to the first embodiment of the present invention. As shown in FIG. 4, the sliding piece 541 is disposed over the second plate 520. A first end of the sliding piece 541 is sustained against the guiding part 522 of the second plate 520.

Especially, the first end of the sliding piece 541 is sustained against the cambered surface 523 of the guiding part 522. A second end of the sliding piece 541 is penetrated through the perforation 531 of the fixing structure 530. In this embodiment, two hooks 545 and 546 are formed on the second end of the sliding piece 541, which is penetrated through the perforation 531 of the fixing structure 530. The hooks 545 and 546 are sustained against the fixing structure 530 for positioning the sliding piece 541, so that the sliding piece 541 is not detached from the fixing structure 530.

Figure 5:
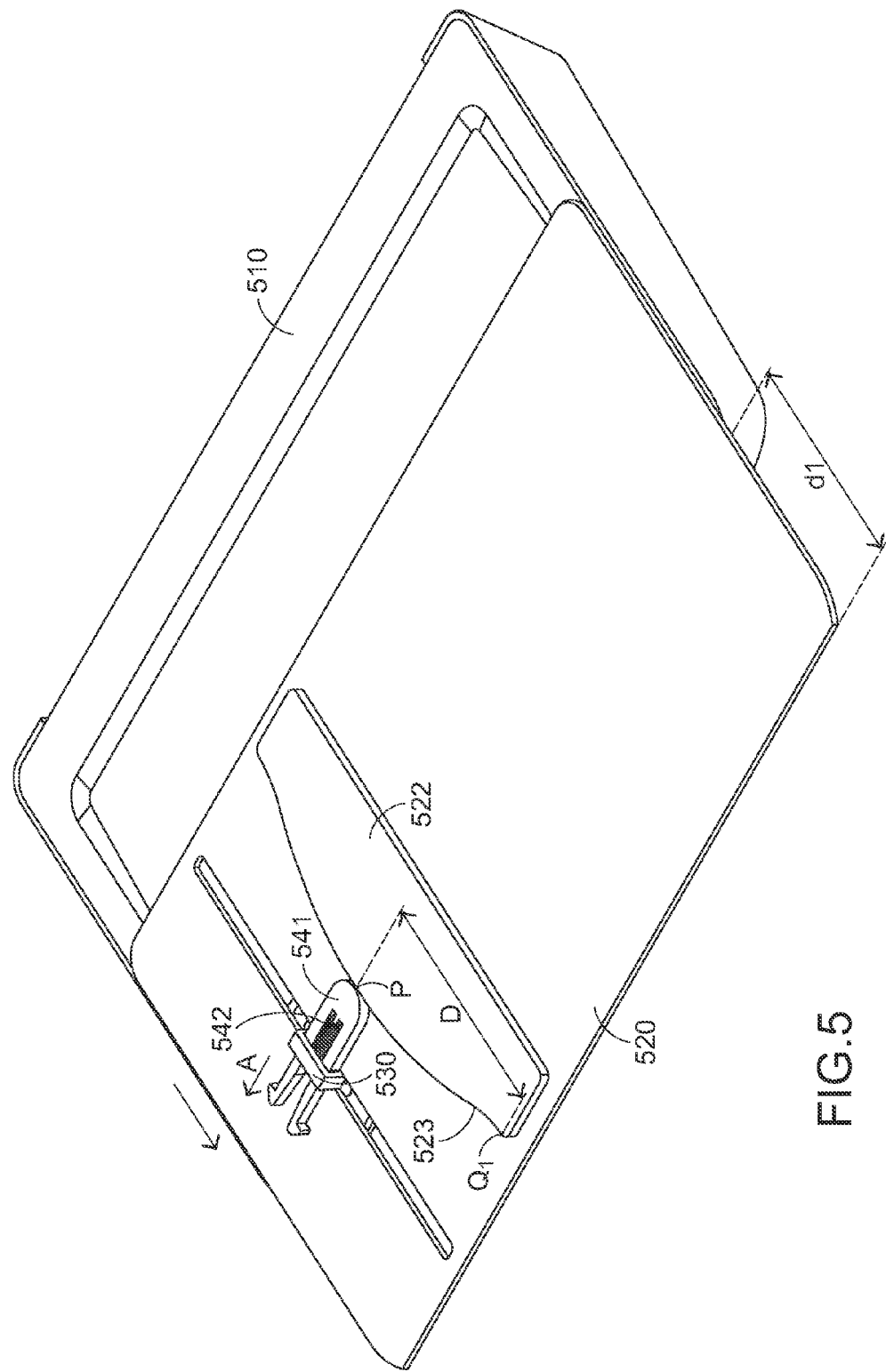
FIG. 5 schematically illustrates a first action of the sliding mechanism according to the first embodiment of the present invention.

Hereinafter, the operations of the sliding mechanism 500 will be illustrated with reference to FIGS. 5 and 6. FIG. 5 schematically illustrates a first action of the sliding mechanism according to the first embodiment of the present invention. As shown in FIG. 5, the second plate 520 is slid with respect to the first plate 510 for a first predetermined distance d1, wherein the first predetermined distance d1 is smaller than or equal to a vertical distance D between the end Q1 and the midpoint P of the camber line of the cambered surface 523. During the second plate 520 is slid with respect to the first plate 510, the sliding piece 541 is guided by the cambered surface 523 of the guiding part 522 to be slid in a first direction A of the fixing structure 530. Under this circumstance, the elastic potential energy is continuously accumulated.

Figure 6:
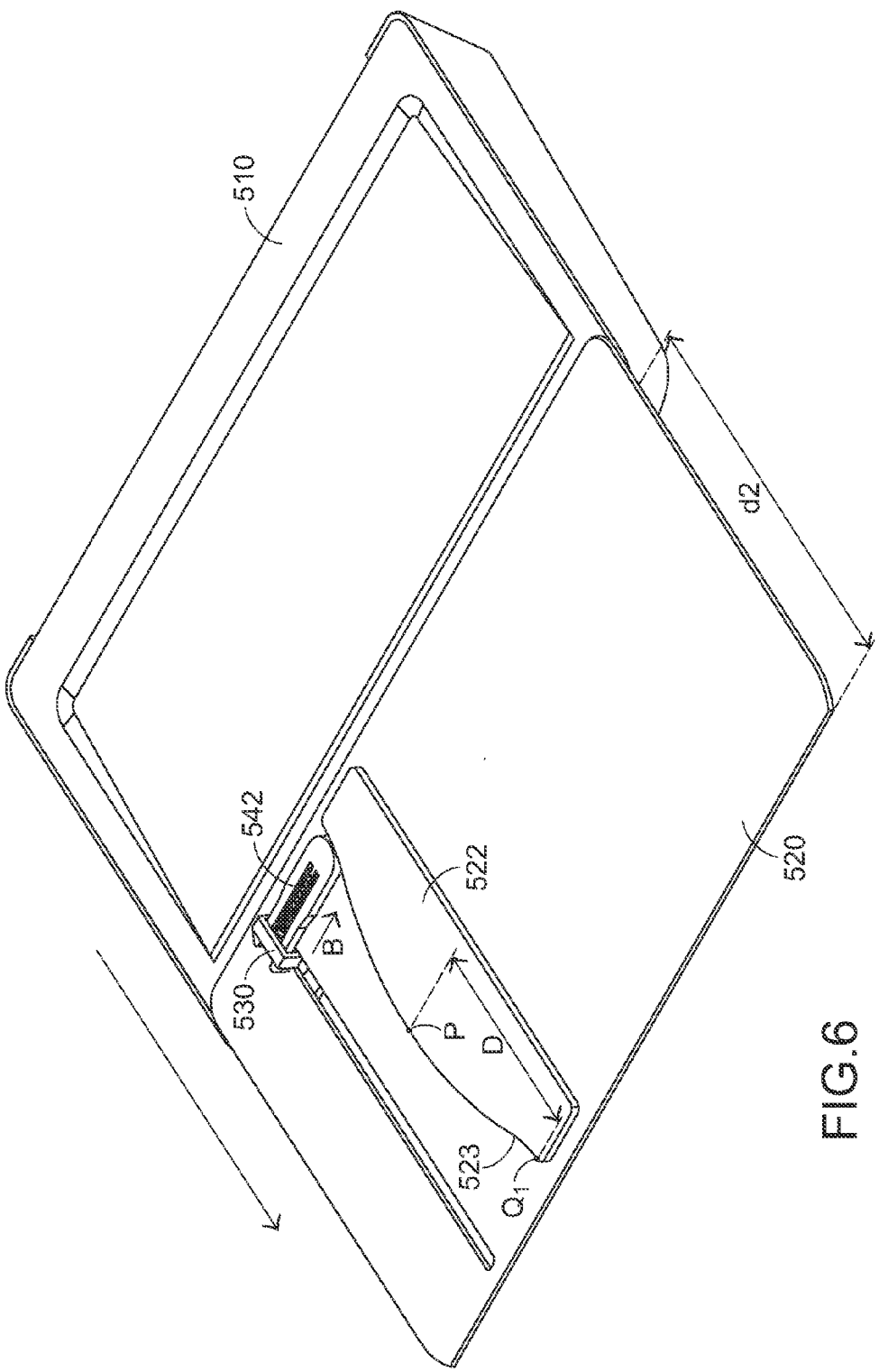
FIG. 6 schematically illustrates a second action of the sliding mechanism according to the first embodiment of the present invention.

FIG. 6 schematically illustrates a second action of the sliding mechanism according to the first embodiment of the present invention. As shown in FIG. 6, the second plate 520 is slid with respect to the first plate 510 for a second predetermined distance d2, wherein the second predetermined distance d2 is greater than the first predetermined distance d1 and also greater than the vertical distance D between the end Q1 and the midpoint P of the camber line of the cambered surface 523. During the second plate 520 is slid with respect to the first plate 510, the sliding piece 541 is guided by the cambered surface 523 of the guiding part 522 to be slid in a second direction B of the fixing structure 530.

Because of the shape change of the cambered surface 523 of the guiding part 522, the resisting action of the elastic element 524 on the guiding part 522 will be weakened. Consequently, the elastic element 542 releases the accumulated elastic potential energy. Under this circumstance, the purpose of automatically sliding the second plate 520 is slid with respect to the first plate 510 is achieved.

Figure 7:
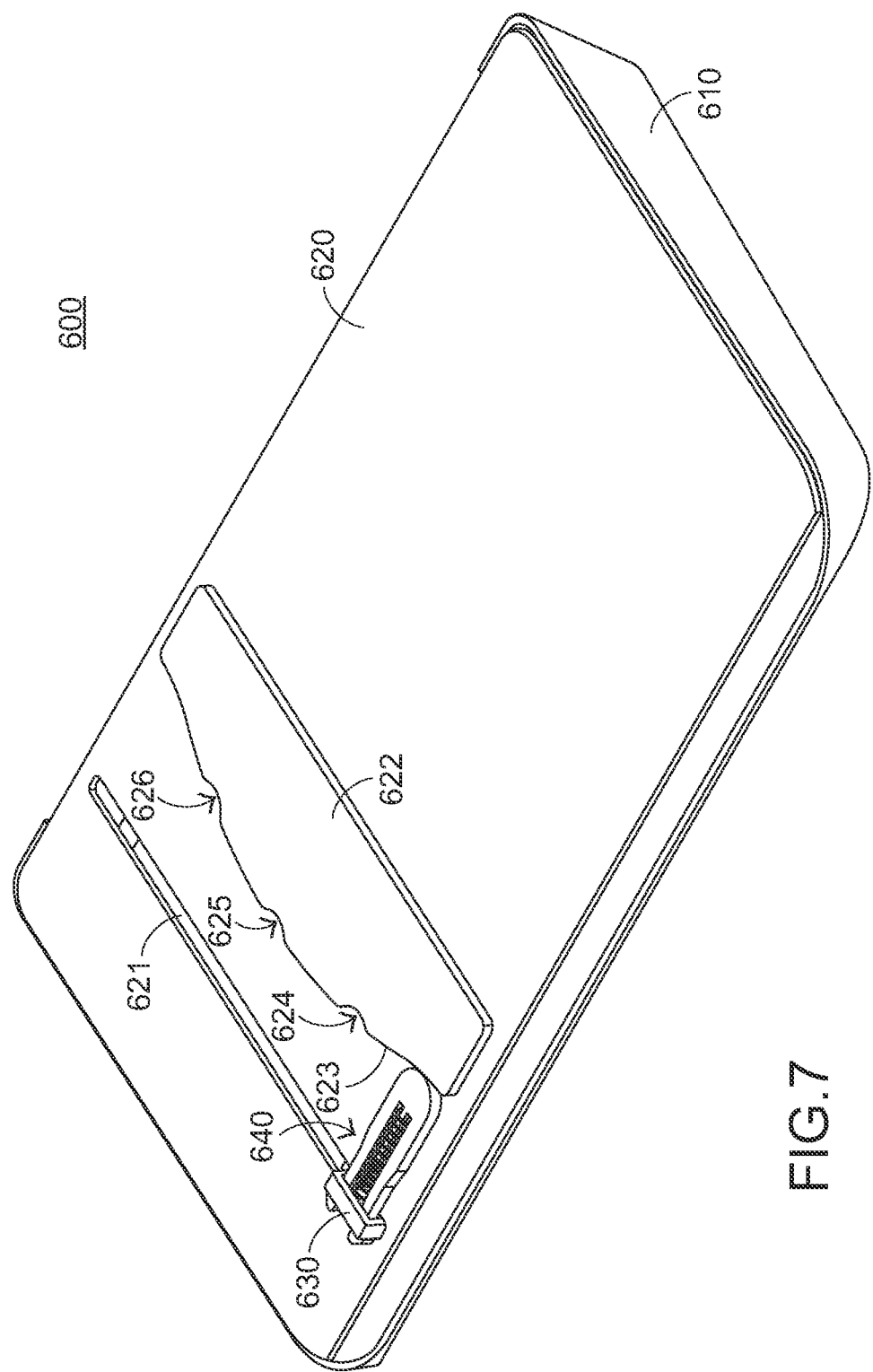
FIG. 7 is a schematic assembled view illustrating a sliding mechanism according to a second embodiment of the present invention.

Please refer to FIG. 7. FIG. 7 is a schematic assembled view illustrating a sliding mechanism according to a second embodiment of the present invention. The sliding mechanism 600 of the second embodiment comprises a first plate 610, a second plate 620, a fixing structure 630 and a sliding member 640. The second plate 620 further comprises a sliding slot 621 and a guiding part 622. The guiding part 622 has a cambered surface 623 for guiding the sliding member 640.

In comparison with the sliding mechanism of the first embodiment (see FIG. 4), the sliding mechanism 600 of the second embodiment further comprises three positioning notches 624, 625 and 626, which are formed in the cambered surface 623 of the guiding part 622. The other components of the sliding mechanism 600 of the second embodiment are identical to those of the first embodiment, and are not redundantly described herein. In this embodiment, when the second plate 620 is slid with respect to the first plate 610, the sliding member 640 can be positioned in one of the positioning notches 624, 625 and 626 to result in a multi-stage sliding function. The multi-stage sliding function can satisfy the usual practices and requirements of different users, thereby enhancing the hand feel of sliding the second plate 620.

Figure 8:
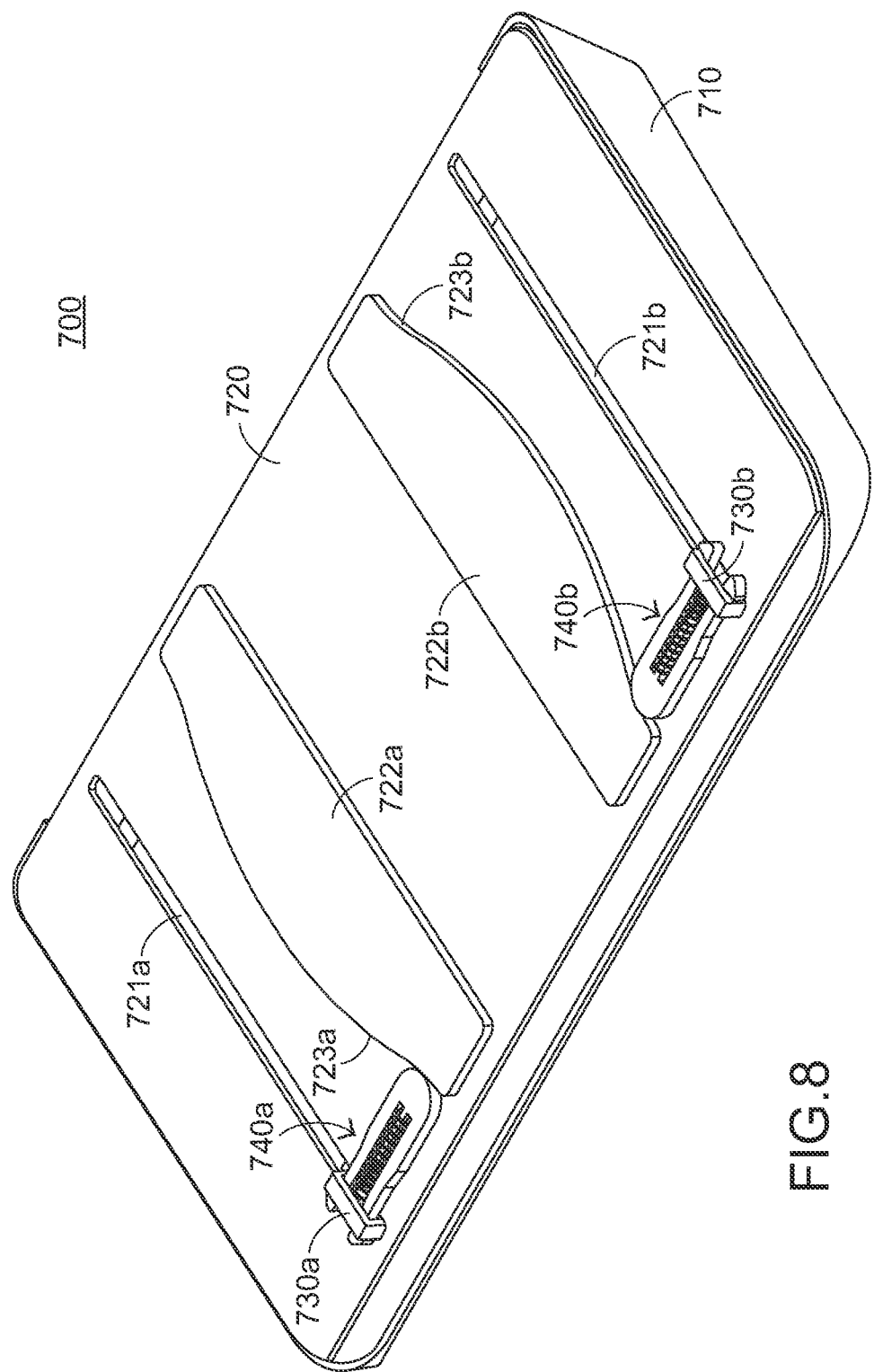
FIG. 8 is a schematic assembled view illustrating a sliding mechanism according to a third embodiment of the present invention.

Please refer to FIG. 8. FIG. 8 is a schematic assembled view illustrating a sliding mechanism according to a third embodiment of the present invention. The sliding mechanism 700 of the third embodiment comprises a first plate 710, a second plate 720, two fixing structures 730a, 730b, and two sliding members 740a, 740b. The second plate 720 further comprises two sliding slots 721a, 721b and two guiding parts 722a, 722b. The guiding parts 722a and 722b have respective cambered surfaces 723a, 723b.

In comparison with the sliding mechanism of the first embodiment (see FIG. 4), the sliding mechanism 700 of the third embodiment further comprises an additional fixing structure 730b, an additional sliding member 740b, an additional sliding slot 721b an additional guiding part 722b. Consequently, the second plate 720 can be slid with respect to the first plate 710 more smoothly. Alternatively, each of the cambered surfaces 723a, 723b of the guiding parts 722a and 722b may have at least one positioning slot. When the second plate 720 is slid with respect to the first plate 710, the sliding members 740a, 740b can be positioned in corresponding positioning notches, thereby enhancing the hand feel of sliding the second plate 720.

Figure 9:
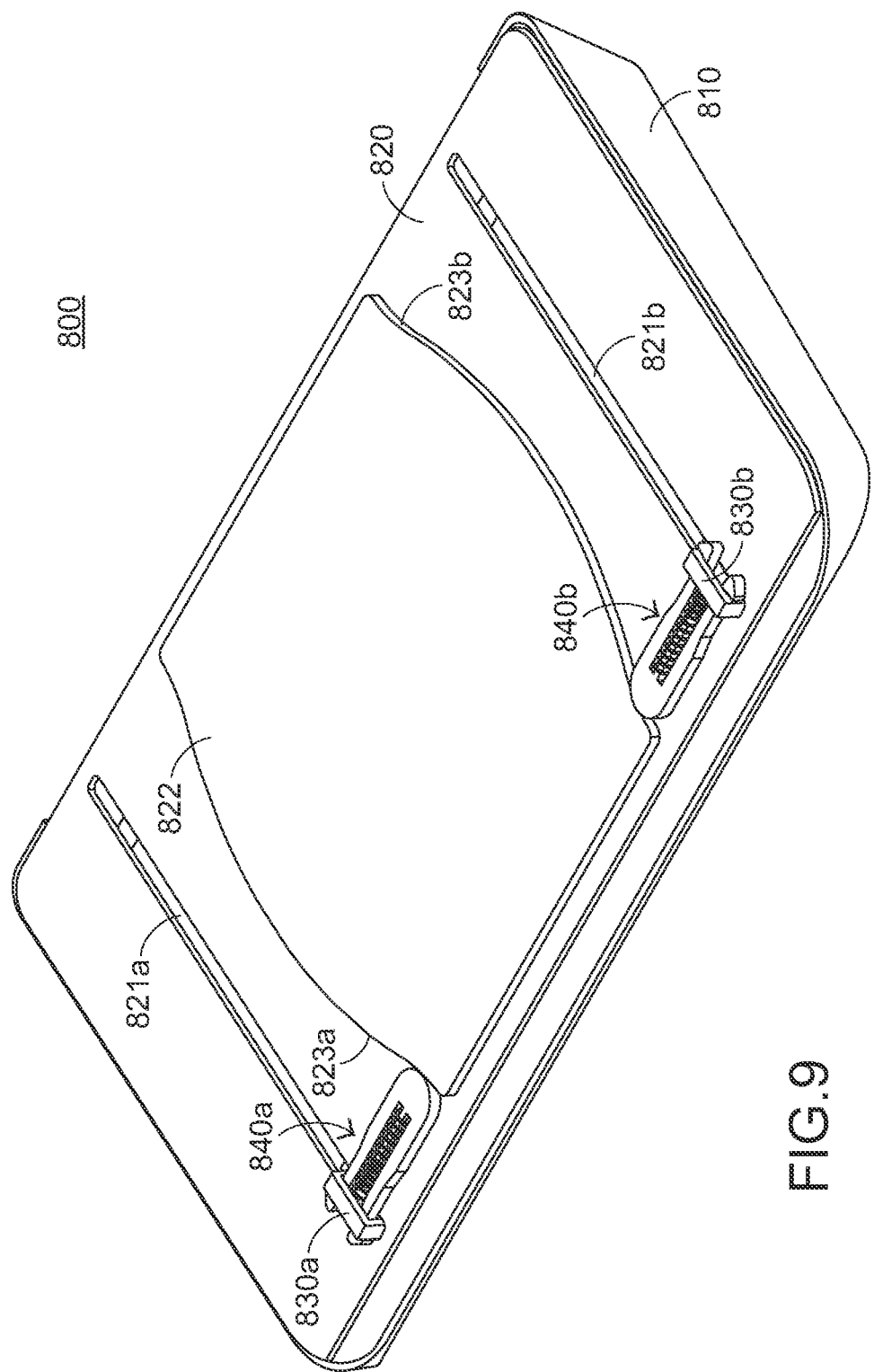
FIG. 9 is a schematic assembled view illustrating a sliding mechanism according to a fourth embodiment of the present invention.

Please refer to FIG. 9. FIG. 9 is a schematic assembled view illustrating a sliding mechanism according to a fourth embodiment of the present invention. The sliding mechanism 800 of the fourth embodiment comprises a first plate 810, a second plate 820, two fixing structures 830a, 830b, and two sliding members 840a, 840b. The second plate 820 further comprises two sliding slots 821a, 821b and a guiding part 822. The guiding part 822 has two cambered surfaces 823a, 823b.

In comparison with the sliding mechanism of the third embodiment (see FIG. 8), the sliding mechanism 800 of the fourth embodiment comprises only a guiding part 822, and the guiding part 822 comprises two cambered surfaces 823a, 823b for guiding the sliding members 840a, 840b. Alternatively, each of the cambered surfaces 823a, 823b of the guiding part 822 may have at least one positioning slot. When the second plate 820 is slid with respect to the first plate 810, the sliding members 840a, 840b can be positioned in corresponding positioning notches, thereby enhancing the hand feel of sliding the second plate 820.

From the above description, the sliding mechanism of the present invention utilizes the fixing structure of the first plate and the sliding member over the second plate to clamp the second plate, so that the second plate is clamped between the first plate and the sliding member. Moreover, by means of the guiding part of the second plate, the sliding member may be slid along the cambered surface of the guiding part. Under this circumstance, the purpose of automatically sliding the second plate with respect to the first plate is achieved without the need of equipping with the guiding rail and installing an additional liner within the guiding groove. The sliding mechanism of the present invention has reduced assembling cost. Moreover, since the sliding mechanism has a simplified structure and easily assembled, the throughput of the sliding mechanism is largely enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sliding mechanism, comprising:
   a first plate;

a second plate disposed over said first plate, and comprising a sliding slot and a guiding part;
a fixing structure having a perforation, wherein said fixing structure is penetrated through said sliding slot of said second plate; and
a sliding member disposed over said second plate, and comprising a sliding piece and an elastic element, wherein said sliding piece has a recess for accommodating said elastic element, a first end of said sliding piece is sustained against said guiding part of said second plate, and a second end of said sliding piece is penetrated through said perforation of said fixing structure, wherein when said second plate is slid with respect to said first plate for a first predetermined distance, said sliding piece is guided by said guiding part to be slid in a first direction of said fixing structure, so that said elastic element generates elastic potential energy, wherein when said second plate is slid with respect to said first plate for a second predetermined distance, said sliding piece is guided by said guiding part to be slid in a second direction of said fixing structure, so that said elastic element releases said elastic potential energy to have said second plate automatically slide with respect to said first plate.

2. The sliding mechanism according to claim 1 wherein said guiding slot is a linear guiding slot.

3. The sliding mechanism according to claim 1 wherein said guiding part has a cambered surface.

4. The sliding mechanism according to claim 3 wherein the distance between a midpoint of a camber line of said cambered surface is smaller than the distance between any end of said camber line and said sliding slot.

5. The sliding mechanism according to claim 1 wherein said elastic element is a spring.

6. The sliding mechanism according to claim 1 wherein a post is formed within said recess of said sliding piece for positioning said elastic element.

7. The sliding mechanism according to claim 1 wherein said first predetermined distance is smaller than said second predetermined distance.

8. The sliding mechanism according to claim 1 wherein said guiding part further comprises at least one positioning notch.

9. A sliding mechanism, comprising:
a first plate;
a second plate disposed over said first plate, and comprising two sliding slots and two guiding parts;
two fixing structures having respective perforations, wherein said two fixing structures are respectively penetrated through said two sliding slots of said second plate; and
two sliding members disposed over said second plate, wherein each of said two sliding members comprises a sliding piece and an elastic element, wherein said sliding piece has a recess for accommodating said elastic element, a first end of said sliding piece is sustained against said guiding part of said second plate, and a second end of said sliding piece is penetrated through said perforation of said fixing structure, wherein when said second plate is slid with respect to said first plate for a first predetermined distance, said two sliding pieces are respectively guided by said two guiding parts to be slid in directions distant from each other, so that said two elastic elements generate elastic potential energy, wherein when said second plate is slid with respect to said first plate for a second predetermined distance, said two sliding pieces are respectively guided by said two guiding parts to be slid in directions facing each other, so that said two elastic elements release said elastic potential energy to have said second plate automatically slide with respect to said first plate.

10. The sliding mechanism according to claim 9 wherein said two guiding slots are linear guiding slots.

11. The sliding mechanism according to claim 9 wherein each of said two guiding parts has a cambered surface.

12. The sliding mechanism according to claim 11 wherein said cambered surface has a camber line, wherein the distance between a midpoint of said camber line of said cambered surface and a corresponding sliding slot is smaller than the distance between any end of said camber line and said corresponding sliding slot.

13. The sliding mechanism according to claim 9 wherein said two elastic elements are springs.

14. The sliding mechanism according to claim 9 wherein a post is formed within said recess of each sliding piece for positioning said corresponding elastic element.

15. The sliding mechanism according to claim 9 wherein said first predetermined distance is smaller than said second predetermined distance.

16. The sliding mechanism according to claim 9 wherein each of said two guiding parts further comprises at least one positioning notch.

17. A sliding mechanism, comprising:
a first plate;
a second plate disposed over said first plate, and comprising two sliding slots and a guiding part;
two fixing structures having respective perforations, wherein said two fixing structures are respectively penetrated through said two sliding slots of said second plate; and
two sliding members disposed over said second plate, wherein each of said two sliding members comprises a sliding piece and an elastic element, wherein said sliding piece has a recess for accommodating said elastic element, a first end of said sliding piece is sustained against said guiding part of said second plate, and a second end of said sliding piece is penetrated through said perforation of said fixing structure, wherein when said second plate is slid with respect to said first plate for a first predetermined distance, said two sliding pieces are respectively guided by said guiding part to be slid in directions distant from each other, so that said two elastic elements generate elastic potential energy, wherein when said second plate is slid with respect to said first plate for a second predetermined distance, said two sliding pieces are respectively guided by said guiding part to be slid in directions facing each other, so that said two elastic elements release said elastic potential energy to have said second plate automatically slide with respect to said first plate.

18. The sliding mechanism according to claim 17 wherein said two guiding slots are linear guiding slots.

19. The sliding mechanism according to claim 17 wherein each of said two guiding parts has a cambered surface.

20. The sliding mechanism according to claim 19 wherein said cambered surface has a camber line, wherein the distance between a midpoint of said camber line of said cambered surface and a corresponding sliding slot is smaller than the distance between any end of said camber line and said corresponding sliding slot.

21. The sliding mechanism according to claim 17 wherein said two elastic elements are springs.

22. The sliding mechanism according to claim 17 wherein a post is formed within said recess of each sliding piece for positioning said corresponding elastic element.

23. The sliding mechanism according to claim 17 wherein said first predetermined distance is smaller than said second predetermined distance.

24. The sliding mechanism according to claim 17 wherein said guiding part further comprises at least one positioning notch.

* * * * *